United States Patent
Bhadani

(10) Patent No.: US 11,263,118 B2
(45) Date of Patent: Mar. 1, 2022

(54) AUTOMATIC TEST SCENARIO GENERATION

(71) Applicant: SAP SE, Walldorf (DE)

(72) Inventor: Akansha Bhadani, Jamshedpur (IN)

(73) Assignee: SAP SE, Walldorf (DE)

( * ) Notice: Subject to any disclaimer, the term of this patent is extended or adjusted under 35 U.S.C. 154(b) by 67 days.

(21) Appl. No.: 16/743,511

(22) Filed: Jan. 15, 2020

(65) Prior Publication Data

US 2021/0216442 A1    Jul. 15, 2021

(51) Int. Cl.
G06F 11/00   (2006.01)
G06F 11/36   (2006.01)
G06N 20/00   (2019.01)

(52) U.S. Cl.
CPC ...... *G06F 11/3684* (2013.01); *G06F 11/3688* (2013.01); *G06F 11/3692* (2013.01); *G06N 20/00* (2019.01)

(58) Field of Classification Search
CPC ............. G06F 11/3684; G06F 11/3688; G06F 11/3692; G06N 20/00
See application file for complete search history.

(56) References Cited

U.S. PATENT DOCUMENTS

| | | | | |
|---|---|---|---|---|
| 9,916,233 | B1* | 3/2018 | Qureshi | G06F 9/45533 |
| 10,210,074 | B1* | 2/2019 | Szerenyi | G06F 11/3688 |
| 10,445,170 | B1* | 10/2019 | Subramanian | G06N 7/005 |
| 10,459,835 | B1* | 10/2019 | George | G16H 40/00 |
| 10,983,904 | B1* | 4/2021 | Sundararaman | G06F 11/3684 |
| 2008/0126880 | A1* | 5/2008 | Hegarty | G06F 11/3684 714/46 |
| 2011/0113287 | A1* | 5/2011 | Gururaj | G06F 11/3684 714/37 |
| 2016/0357660 | A1* | 12/2016 | Dean | G06F 8/00 |
| 2019/0065350 | A1* | 2/2019 | Kunz | G06F 11/3692 |
| 2020/0327046 | A1* | 10/2020 | Rizvi | G06F 11/3664 |
| 2020/0379891 | A1* | 12/2020 | Canter | G06F 11/3664 |
| 2020/0409819 | A1* | 12/2020 | Acharyya | G06F 11/366 |
| 2021/0124674 | A1* | 4/2021 | Mamadapur | G06N 20/00 |

OTHER PUBLICATIONS

Automated Testing Software, Capterra, https://www.capterra.com/automated-testing-software/, at least as early as Jan. 15, 2020, 8 pages.

(Continued)

*Primary Examiner* — Joshua P Lottich
(74) *Attorney, Agent, or Firm* — Klarquist Sparkman, LLP

(57) ABSTRACT

Techniques and solutions are described for facilitating software testing. A test script is automatically generated from an incident report. Natural language processing can be used, at least in part, to generate the test script. The test script can be manually or automatically executed, including automatically executing the test script upon the occurrence of trigger event or according to a schedule. A trigger event can include determining that a software update has been deployed and is available for testing. It can be determined whether test execution indicates that a particular program behavior, such as an error, has been resolved. Machine learning can be used to classify program behavior. A user interface screen can be rendered to present test results.

20 Claims, 16 Drawing Sheets

(56) References Cited

OTHER PUBLICATIONS

20 Best Automation Testing Tools (Mar. 2021 Update), Guru 99, https://www.guru99.com/automated-testing-tools.html, at least as early as Jan. 15, 2020, 18 pages.
Natural Language Toolkit, https://www.nltk.org/, at least as early as Jan. 15, 2020, 2 pages.
IT Operations Management, Servicenow, https://www.servicenow.com/products/it-operations-management.html, at least as early as Jan. 15, 2020, 8 pages.
Selenium automates browsers. That's it! https://www.selenium.dev/, at least as early as Jan. 15, 2020, 4 pages.
Szybowski, SAP Integration, Knowldge11, https://www.slideshare.net/aspediens/k11-europe-sapintegrationbreakout?next_slideshow=1, Dec. 5-8, 2011, 59 pages.
Alpha Sirius Inc., Bridging the Gap Solution Manager to Service Now Integration, https://www.slideshare.net/alphasirius/bridging-the-gap-sap-solution-manager-to-servicenow-integration, at least as early as Jan. 15, 2020, 9 pages.
"Automated Testing Software," Capterra, retrieved from the Internet, https://www.capterra.com/automated-testing-software/, visited at least as early as Jan. 14, 2020, 126 pages.
"Top 10 Automation Testing Tools in 2020," GURU99, retrieved from the Internet, https://www.guru99.com/automated-testing-tools.html, visited at least as early as Jan. 14, 2020, 19 pages.
"Natural Language Toolkit" NLTK, retrieved from the Internet, https://www.nltk.org/, visited at least as early as Jan. 14, 2020, 2 pages.
"IT Operations Management" servicenow, retrieved from the Internet, https://www.servicenow.com/products/it-operations-management.html, visited at least as early as Jan. 14, 2020, 12 pages.
"Selenium automates browsers. That's it!" Selenium, retrieved from the Internet, https://selenium.dev/, visited at least as early as Jan. 14, 2020, 4 pages.
"SAP Integration," SlideShare, retrieved from the Internet, https://www.slideshare.net/aspediens/k11-europe-sapintegrationbreakout?next_slideshow=1, visited at least as early as Jan. 14, 2020, 59 pages.
"Bridging the Gap Solution Manager to Service Now Integration," SlideShare, retrieved from the Internet, https://www.slideshare.net/alphasirius/bridging-the-gap-sap-solution-manager-to-servicenow-integration, visited at least as early as Jan. 14, 2020, 8 pages.

* cited by examiner select * from IIRS.dbo.Incident; ← 410

Insert into IIRS.dbo.Incident (IncidentNumber, Status, CreatedOn, ReportedBy, IsRetested, Description, UpdatedResult, ModifiedOn, Picked by) values ('INC00004', 'COMPLETED', GETDATE(), 'Akansha',1,'Step1: Open the app at htto://localhost:3000. Step2: Search button not working, 'Completed', GETDATE(), 'Sri')

Update IIRS.dbo.Incident set RetestResult= ' ', RetestDescription=' ', Status='SOLUTION_PROVIDED', IsRetested = '0' where Id=5

| Id | IncidentNum. | Status | CreatedOn | ReportedBy | Is Retested | Description | ModifiedOn | PickedBy | Retest Description | Error Category | Retest Result |
|---|---|---|---|---|---|---|---|---|---|---|---|
| 1 | INC00123 | InProgress | NULL | Akansha | NULL | NULL | NULL | NULL | NULL | NULL | NULL |
| 2 | INC00124 | InProgress | NULL | Akansha | NULL | NULL | NULL | NULL | NULL | NULL | NULL |
| 3 | INC00001 | InProgress | 2020-03-23 | Arthini | 0 | Step 1: Open the app at localhost3000. Step 2... | 2020-03-23 | Akansha | NULL | NULL | NULL |
| 4 | INC00002 | InProgress | 2020-03-23 | Akansha | 0 | Step 1: Open the app at localhost3000. Step 2... | 2020-03-25 | Anja | NULL | NULL | NULL |
| 5 | INC00003 | Resolved | 2020-03-23 | Anja | 0 | Open the app at localhost3000. Enter INC00... | 2020-04-02 | Akansha | NULL | NewDefect | |
| 6 | INC00004 | InProgress | 2020-03-23 | Akansha | 1 | Step 1: Open the app at localhost3000. Step 2... | 2020-03-25 | Akansha | NULL | NULL | NULL |
| 7 | NULL | InProgress | 2020-03-23 | Arthini | NULL | NULL | NULL | NULL | NULL | NewDefect | NULL |

FIG. 4

Reply

Hi,

The label text for field which had format issues has been updated. The text for the field would be 'Release Order Qty'. The issue has been fixed by re-activating the CDS view 'C_CntrlContrCnsmpnQry'. Transport 'ER9K8A6DA9'.
↳ 610

Thanks,
Akansha

↱ 600

| | |
|---|---|
| Descripti... | Improper format ↲ 620 |
| Compon... | MM-FIO-PUR_ANA<br>Fiori UI for Purchasing Analytics |
| Status: | Solution Provided |
| Priority: | Medium |
| Processor: | Anja |
| Reporter: | Akansha ↲ 620 |
| Info: | |
| Error Cat... | New defect ↲ 620 |
| System: | |

FIG. 6

Browser is being controlled by automated test software

760

| Incident Number | Reported On | Reported By | Solution Provided | Issue Description |
|---|---|---|---|---|
| INC00001 ⌐765 | 13-05-20 | Akansha | | Search button not working |
| INC00002 | 13-05-20 | Akansha | | Search button not working |
| INC00003 | 13-05-20 | Akansha | | Search button not working |
| INC00004 | 13-05-20 | Akansha | | Search button not working |
| INC00005 | 13-05-20 | Akansha | | Search button not working |
| INC00006 | 13-05-20 | Akansha | | Search button not working |
| INC00007 ⌐765 | 13-05-20 | Akansha | | Search button not working |

FIG. 7C

```
from controller.croncontroller import CronController
cronController = CronController()
cronController.createConnection()
```

FIG. 8A

```
import pyodbc
class mysqlConnector(object):
def connectMySQl(self,callback):
db = pyodbc.connect(
Driver="{SQL Server Native Client 11.0};",
Server="localhost",
Database="IIRS",
Trusted_Connection="yes"
)
if db:
print("great! you are connected")
callback(db)
else:
print("connection failed")
callback("FAILED")
```

FIG. 8B

```
import schedule
import time
from db import mysqlConnector
from controller.wordProcessor import TokenController
from selenium import webdriver
from nltk.tokenize import sent_tokenize
class CronController(object):
__instance = None
__mySqlcon = None
inputElement = None
#constructor
def __init_(self):
if self.__instance != None:
raise Exception("This class is singleton")
else:
CronController.__instance=self
def getInstance(self):
" static access method"
if self.__instance == None:
CronController()
return self.__instance
def dbCallback(self,db):
print(db)
if db:
self.__mySqlcon = db
self.checkIncidents()
else:
__mySqlcon = ""
def createConnection(self):
connection = mysqlConnector()
connection.connectMySQl(self.dbCallback)
def checkIncidents(self):
schedule.every(.5).minutes.do(self.checkIncident)
while True:
schedule.run_pending()
time.sleep(1)
def checkIncident(self):
print(self.__mySqlcon)
try:
cursor=self.__mySqlcon.cursor()
query = "select * from Incident where Status='SOLUTION_PROVIDED' and ErrorCategory='NewDefect' and IsRetested='0'"
cursor.execute(query)
results = cursor.fetchall()
if cursor.arraysize > 0:
for row in results:
id = row[1]
```

FIG. 8C

```
Status = row[2]
Description = row[6]
tokenController = TokenController()
tokenController.test(Description,
id,self.startRetesting)
else:
print("No Incident for retesting.")
except Exception as e:
print("exception occurred."+e)
# finally:
# self.__mySqlcon.close();
def startRetesting(self,id):
print("fetch new test description.");
retestingScriptSteps=[];
try:
cursor = self.__mySqlcon.cursor()
cursor.execute('''select * from Incident where
IncidentNumber = ?''', id)
results = cursor.fetchall();
if cursor.arraysize > 0:
for row in results:
id = row[1]
RetestDescription = row[9]
else:
print("No Incident for retesting.")
finalRetestSteps = [];
length = len(RetestDescription)
i = 0
#finalRetestSteps=sent_tokenize(RetestDescription)
#finalRetestSteps.index('http:')
driver =
webdriver.Chrome(executable_path="C:\chromedriver.exe");
# driver.implcitly_wait(10)
driver.maximize_window();
driver.get("http://localhost:3030");
el = driver.find_element_by_name("searchBox");
text = "INC00003";
for character in text:
el.send_keys(character)
time.sleep(0.5) # pause for 0.3 seconds
driver.find_element_by_name("showAllBtn").click();
inputElement
=driver.find_element_by_id("searchContainer");
tokenController = TokenController()
tokenController.updateRetestResult(inputElement,
id);
except Exception as e:
#driver.close();
tokenController = TokenController()
tokenController.updateRetestResult("", id);
```

FIG. 8D

```
from nltk.tokenize import sent_tokenize
from db import mysqlConnector
class TokenController(object):
__instance = None
__mySqlcon = None
def createConnection(self):
connection = mysqlConnector()
connection.connectMySQl(self.dbCallback)
def dbCallback(self,db):
print(db)
if db:
self.__mySqlcon = db
else:
__mySqlcon = ""
def test(self.description,Id,callback):
self.createConnection()
print(sent_tokenize(description))
print(Id)
retestSteps=sent_tokenize(description);
finalRetestSteps = "";
length = len(retestSteps)
i = 0
# Iterating using while loop
while i < length:
finalRetestSteps += ("Step:" + "-" +
retestSteps[i]+" ")
i += 1
try:
cursor = self.__mySqlcon.cursor()
query = "update Incident set RestestDescription= %s
where IncidentNumber = %s"
cursor.execute("'update Incident set
RestestDescription= ? where IncidentNumber = ?'",
finalRetestSteps, Id)
self.__mySqlcon.commit()
finally:
self.__mySqlcon.close()
callback(Id)
print("Updated db")
def updateRetestResult(self,retestResult,id):
try:
finalresult="Pass";
if retestResult == "":
finalresult = "Fail"
self.createConnection()
cursor = self.__mySqlcon.cursor()
cursor.execute(
'''update Incident set RetestResult = ? ,
IsRetested='1' where IncidentNumber = ?''',
finalresult, id)
self.__mySqlcon.commit();
finally:
self.__mySqlcon.close()
```

FIG. 8E

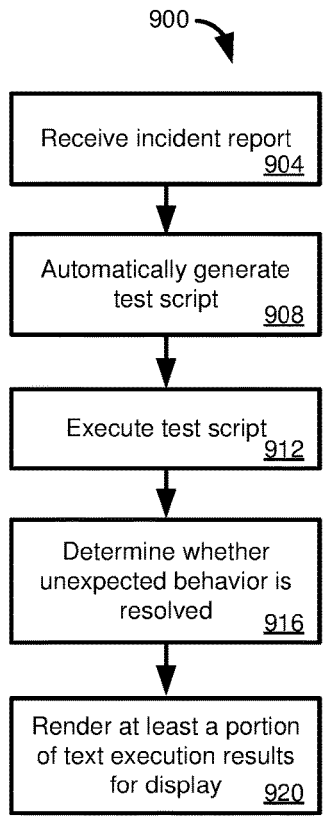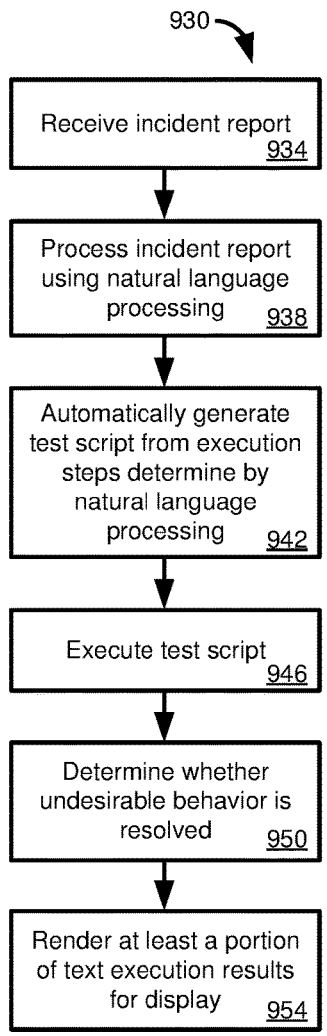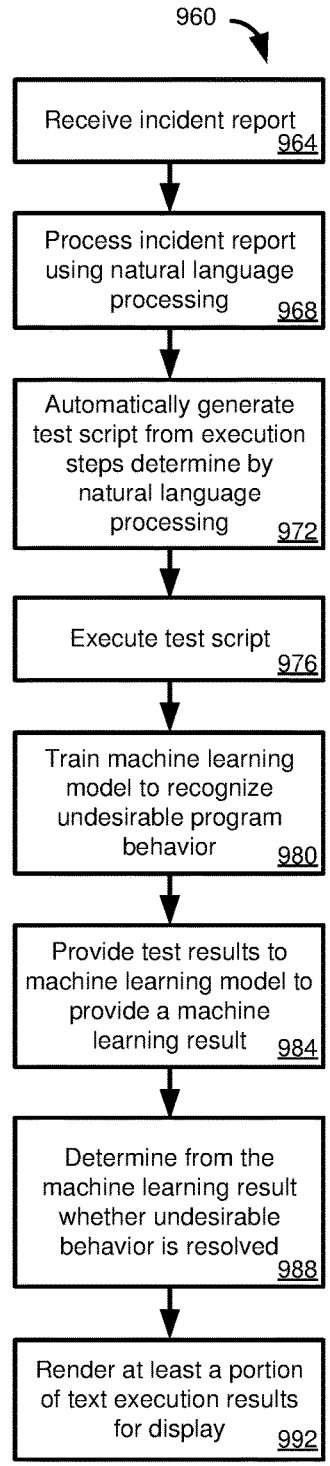
FIG. 9A
FIG. 9B
FIG. 9C

US 11,263,118 B2

AUTOMATIC TEST SCENARIO GENERATION

FIELD

The present disclosure generally relates to software testing. Particular implementations relate to automatically generating a test scenario, such as a test script, that can be manually or automatically executed.

BACKGROUND

Software is increasingly complex, particularly for large enterprise applications. This complexity can lead to increased amounts of software errors, or bugs. In addition, the complexity of the software can increase the time and effort needed to locate the source of an error, develop a solution, and test the proposed solution to ensure that the problem is solved (and that no new errors have been introduced). Investigating, correcting, and testing software errors can be even more complex when software may be used on different computing environments (e.g., with different hardware or different applications that may interact with a given software application). Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are described for facilitating software testing. A test script is automatically generated from an incident report. Natural language processing can be used, at least in part, to generate the test script. The test script can be manually or automatically executed, including automatically executing the test script upon the occurrence of trigger event or according to a schedule. A trigger event can include determining that a software update has been deployed and is available for testing. It can be determined whether test execution indicates that a particular program behavior, such as an error, has been resolved. Machine learning can be used to classify program behavior. A user interface screen can be rendered to present test results.

In one embodiment, a method is provided of automatically generating a test script for an incident report associated with undesirable program behavior and determining whether the undesirable program behavior has been resolved. An incident report is received. The incident report includes one or more actions that resulted in unexpected behavior of a computer program. A test script is automatically generated from the incident report. The test script is executed to provide execution results. It is determined whether the test execution results indicate resolution of the unexpected behavior. A user interface display is rendered that includes at least a portion of the test execution results.

In another aspect, another example method is provided of automatically generating a test script for an incident report associated with undesirable program behavior and determining whether the undesirable program behavior has been resolved. An incident report is received. The incident report includes one or more actions that resulted in undesirable behavior of a computer program. The incident report is processed using natural language processing techniques to generate a plurality of execution steps carried out in generating the undesirable behavior. A test script is automatically generated from the plurality of execution steps. The test script is executed to provide execution results. It is determined whether the test execution results indicate resolution of the undesirable behavior. A user interface display is rendered that includes at least a portion of the test execution results.

In a further aspect, an additional method is provided of automatically generating a test script from an incident report associated with undesirable program behavior and determining whether the undesirable program behavior has been resolved. An incident report is received. The incident report includes one or more actions that resulted in undesirable behavior of a computer program. The incident report is processed using natural language processing techniques to generate a plurality of execution steps carried out in generating the undesirable behavior. A test script is automatically generated from the plurality of execution steps. The test script is executed to provide execution results.

A machine learning model is trained to recognize undesirable program behavior. The test execution results are provided to the machine learning model to provide a machine learning result. The machine learning result is used to determine whether the test execution results resolved the undesirable behavior. A user interface display is rendered that includes at least a portion of the test execution results.

The present disclosure also includes computing systems and computer readable storage media configured to carry out, or including instructions for carrying out, an above-described method. As described herein, a variety of other features and advantages can be incorporated into the technologies as desired.

BRIEF DESCRIPTION OF THE DRAWINGS

FIG. 4 is an example user interface screen displaying information for incidents, including retesting status.

FIG. 6 is an example incident report.

FIGS. 7A-7C are example user interface screens illustrating software re-testing.

FIGS. 8A-8E are example Python source code providing a particular implementation of disclosed technologies.

FIGS. 9A-9C are flowcharts illustrating example operations in particular embodiments for automatically generating test scripts and determining whether test results indicate that a program behavior has been resolved.

DETAILED DESCRIPTION

Example 1—Overview

Figure 1:
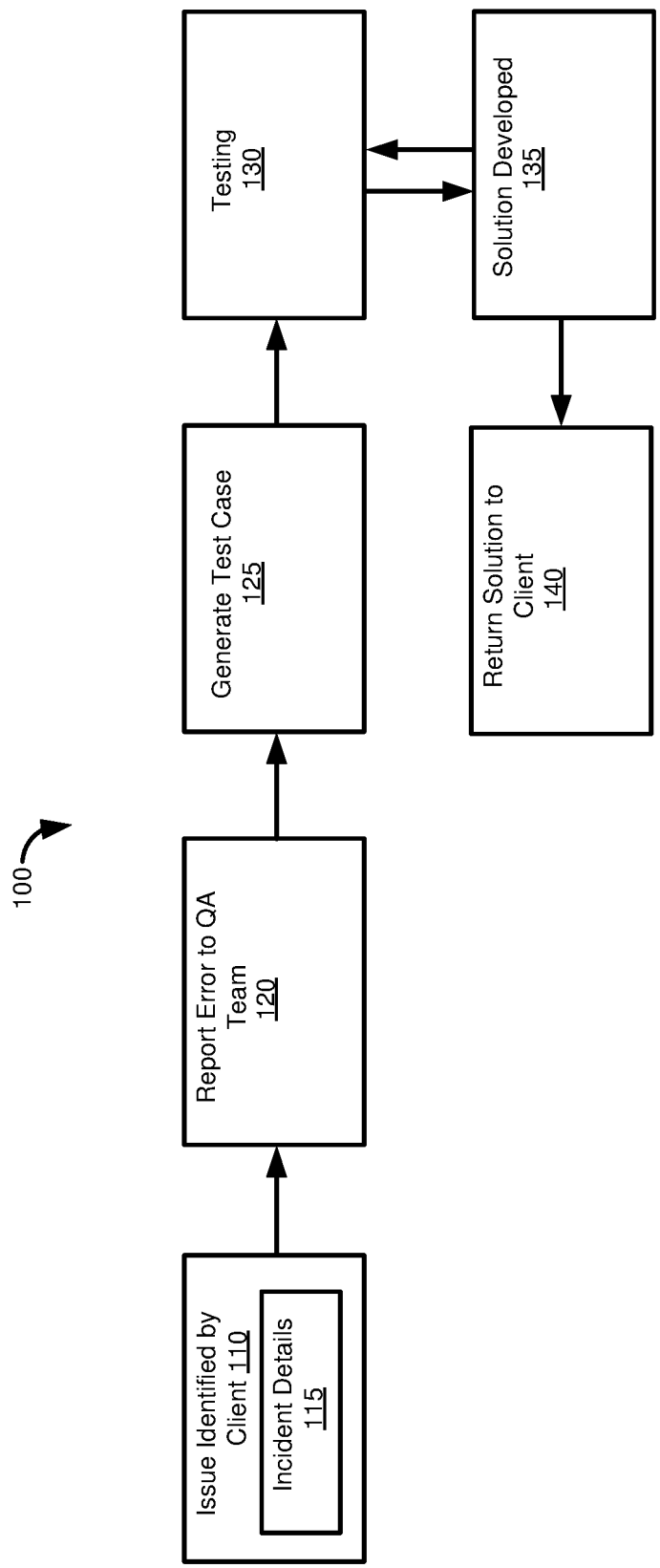
FIG. 1 is a schematic diagram illustrating a process for error reporting and resolution.

Software is increasingly complex, particularly for large enterprise applications. This complexity can lead to increased amounts of software errors, or bugs. In addition, the complexity of the software can increase the time and effort needed to locate the source of an error, develop a solution, and test the proposed solution to ensure that the problem is solved (and that no new errors have been introduced). Investigating, correcting, and testing software errors can be even more complex when software may be used on different computing environments (e.g., with different hardware or different applications that may interact with a given software application).

Additional issues can arise when there is a separation between testing, or quality, systems and production systems. That is, even if a solution is developed on a testing system, the solution may need to be deployed to a production system. It may be useful for software developer/testers to know when a solution has been implemented on a production system, and to confirm that it is working on the production system as expected. However, particularly with the large number of issues that a development team may be addressing at any one time, it can be difficult to follow up on software errors for which solutions were developed to confirm that an end user's issue has been appropriately resolved. Similarly, there can be delays in when a solution is available for testing on a development system. Accordingly, room for improvement exists.

When a software error is encountered, it is typically desirable to record information regarding the circumstances of the error. That is, in order to reproduce the error, it can be useful to know in what software the error was encountered, user or other actions that preceded (and may have caused or identified) the error, and hardware and software environmental details regarding the computing system on which the error occurred. For example, it can be helpful to know what version of the software that generated the error, and other programs that might have been interacting with such software, including other application programs or operating system components.

As used herein, software errors or undesirable or unexpected program behavior (collectively referred to for this discussion as software errors for convenience of presentation) can refer to any program behavior for which a correction is desired. A software error can be an error such as a program crash or lack of functionality (e.g., a user interface control fails to work, or a process fails to start). Software errors can also include misspellings, broken hyperlinks, or erroneous user interface generation (e.g., missing or wrong tooltips, misspellings).

Typically, a software developer needs to review and manually reconstruct a scenario that led to the error, both to investigate possible causes of (and therefore possible solutions for) the error and to confirm that any putative solution in fact resolves the error. Even reconstructing this scenario a single time can be time consuming. However, the error resolution process may require a developer or tester to manually reconstruct the scenario many times. In addition to being time consuming, this manual reconstruction can be error prone, particularly if multiple actions are required in order to generate an error or test for its resolution.

Disclosed technologies can assist in testing software errors by automatically generating automatically-executable test scenarios, such as scripts, that can be executed to try and reproduce an error or to determine whether the error has been resolved. In some cases, error (or incident) reports can be provided in a format that facilitates the generation of test scripts. For example, an error report can have fields that can be manually populated by a user, automatically filled by a software application, or a combination thereof. Fields can include those which identify properties such as an application in which the error occurred, the version number of the application, hardware details of the system on which the error occurred, and information regarding the operating system or other applications running on a system (e.g., a database application that is accessed by a software application associated with a reported error).

In other cases, reports need not have a particular format. Machine learning techniques, including natural language processing, can be used to identify and extract relevant information from an arbitrary report (e.g., provided in a word processing document, email, form, or another manner). For example, the NLTK natural language toolkit (available from NLTK Project) for the Python programming language can be used to extract relevant text from an error report. The natural language component, or another component, including another machine learning component, can use the extracted text to build an automatically-executable test case. In some cases, these test cases can be saved, while in other cases they can be generated on the fly when a test is to be carried out.

Test cases can be automatically executed by software, either by the software application itself or using another program. For example, for web based programs, the Selenium suite of programs (available from Software Freedom Conservancy) can be used to automate web browsers, including for testing purposes. However, similar techniques can be used for other software applications, including generating scripts that can be automatically executed.

In some cases, test case generation can be automated, but test execution or test result determination can be manually performed. In other cases, one or both of test execution or test result determination can also be performed automatically. For example, a testing component can automatically execute a test scenario, including based on the occurrence of various triggers, which can include triggers based on a particular schedule or the detection of particular events. When testing occurs automatically, a user may still be able to manually trigger the execution of a test scenario, if desired.

Machine learning techniques can be used to determine a testing result. For example, a machine learning model can be generated by analyzing records of reported incidents. In one scenario, execution of a reported incident can be used to reproduce an error and train the machine learning model to recognize the error condition. A corrected code version can be executed and used to train the machine learning model to recognize non-erroneous behavior. In addition, or alternatively, other types of results can be used to determine whether an error has been corrected, such as if a program crash or reported error no longer occurs. In yet further cases, an error can be marked as at least potentially resolved as long as a known error does not occur after retesting. In some scenarios, a developer or tester can manually confirm that the observed behavior is the expected/correct behavior.

Testing can be scheduled for errors that have been reported, even if such errors have putatively been addressed. For example, if a change is made in a quality system, it may take time before the change is propagated to a production system. The production system can be polled periodically to determine whether a change has been implemented on the production system. In some cases, if the change is implemented, additional testing can occur. Scheduled testing can also be useful to determine that previously addressed errors have not reoccurred after other changes to a software application, or to software or hardware operating environment components used with the software application. For example, as part of evaluating a software update, tests for one or more previously reported errors can be executed to determine whether the error occurs in the updated software.

Results of testing can be provided to a user, such as a tester or software developer. In some cases, the results can be provided upon user request. In other cases, alerts can be provided, such as if a code fix was delivered to a production system but failed to address the corresponding error.

Thus, disclosed technologies can greatly reduce the effort needed to generate and test solutions for software errors. The technologies can be used in various scenarios. For example, if a developer or tester is specifically testing code for errors, a test case or scenario can be for re-testing (i.e., reproducing a test originally carried out by the developer or tester). In other cases, such as when a test case is generated from an incident report provided by an end user, the test case can be used to perform initial testing of a proposed solution. In some cases, a tester or developer may wish to try and reproduce an incident reported by an end user. Test cases generated using disclosed technologies can be executed prior to work in developing a solution for a reported incident.

Example 2—Example Training and Use of Machine Learning Component

FIG. 1 is a diagram of an overall process flow 100 that can be used in embodiments of the disclosed technologies. At 110, a software issue, such as a bug or other error, is identified by a client. A client can be an end user of an application, or can be a developer or tester. That is, for example, issues can be identified by parties who have purchased and use software, or can be identified by a company that develops the software, including as part of development/testing or as part of providing services to an end user using the software. In some cases, software can automatically determine when program operation may be erroneous (including, but not limited to, experience a crash or other program error) and can generate a corresponding incident report.

An identification of a software issue at 110 can include generating incident details 115. In some cases, incident details 115 can be automatically generated, at least in part. For example, incident details 115 can include crash reports/dumps or information automatically retrieved from an operating environment for the software associated with the incident. Information included in the incident details can include an identifier for the software that generated the incident, a version of the software, an identifier for a screen or process that was being used when the incident occurred, information regarding any services being used by the software at the time of the incident (e.g., calls to external programs, use of network resources), an operating system for a computing device on which the software was executing at the time of the incident, hardware details for the computing device on which the software was executing at the time of the incident (e.g., a number of processors, an amount of processor use, disk type/model, amount of installed memory, and amount of available memory), other information, or combinations of such information.

The incident details 115 also include actions that led to the error associated with the relevant incident. Actions can include automatic actions, such as processes or subroutines executed by the software, or user input actions and associated actions (e.g., processes or subroutines) executed by the application in response to the user input actions. User input actions can include interactions with user interface controls or input provided, such as in text entry fields. In some cases, these actions, particularly user actions, can be manually input as part of generating the incident details 115. In other cases, user actions can be tracked (e.g., logged) during software execution and such tracked actions can be automatically added to the incident details 115.

The incident details 115 can be sent to a quality assurance team at 120. In some cases, the incident details 115 can be pushed, such as generating a message to a developer that an incident has occurred. In other cases, the incident details 115 are stored and can be retrieved by a developer/tester at 120, such as by issuing a query to find new or outstanding (i.e., unresolved) incidents.

A test case for a given set of incident details 115 can be generated at 125. The test case is executable, including a sufficient number of actions to reproduce the error associated with the incident corresponding to the incident details 115. The test case can be automatically executed by a software program, including the software program that experienced the incident associated with a set of incident details 115. Execution of a test case can be facilitated by automation software, including Selenium (available from Software Freedom Conservancy), LEAPWORK (available from Leapwork of Copenhagen, Denmark), RANOREX (Ranorex Inc., of Houston, Tex.), or the eCATT tool provided by SAP SE, of Walldorf, Germany.

In some cases, generating a test case at 125 can include converting incident details 115 from a particular format into another format useable by automation software or by native software (e.g., an application that experienced an error). For example, incident details 115 can be provided according to a schema, with various elements of the schema being associated with tags or other identifiers such that they can be converted to a format used by the automation software. In other cases, incident details 115 are not provided in a specific format and are extracted using natural language processing. Natural language processing results can be converted to a schema and then converted to a format useable by automation software as described above. Or, machine learning techniques can be used to convert natural language processing results to a format useable by automation software.

In some scenarios, the test case generated at 125 can be prepared before an incident is reported to the quality assurance team at 120. For example, the test case generated at 125 can be tested at 130, such as to confirm that the reported error occurs, or to gather additional details regarding the error generation that may be useful to a developer (e.g., using a program execution monitor, such as VALGRIND, available from Valgrind Developers), prior to being made available.

After an incident is reported at 120, a solution can be developed at 135. The solution can be tested at 130. If the solution passes testing at 130, it can be returned to the client at 140. Or the solution can be implemented, and the client can be sent a notification at 140 that the error should be resolved. If the solution does not pass testing at 130, the developer can revise the solution at 135, with the revised solution being retested at 130. This process can continue until an acceptable solution is generated.

Generally, after a test case 125 is executed, notifications can be provided, such as to a developer or a client (e.g., an end user). Notifications can be particularly useful when it is uncertain when a test might be executed, such as if there is a delay between a solution being developed and the solution being deployed and testable. For example, even if a solution is prepared, it may need to be incorporated into a next build of the software, which may take some time to occur.

Example 3—Example Computing Environment with Testing Framework

Figure 2:
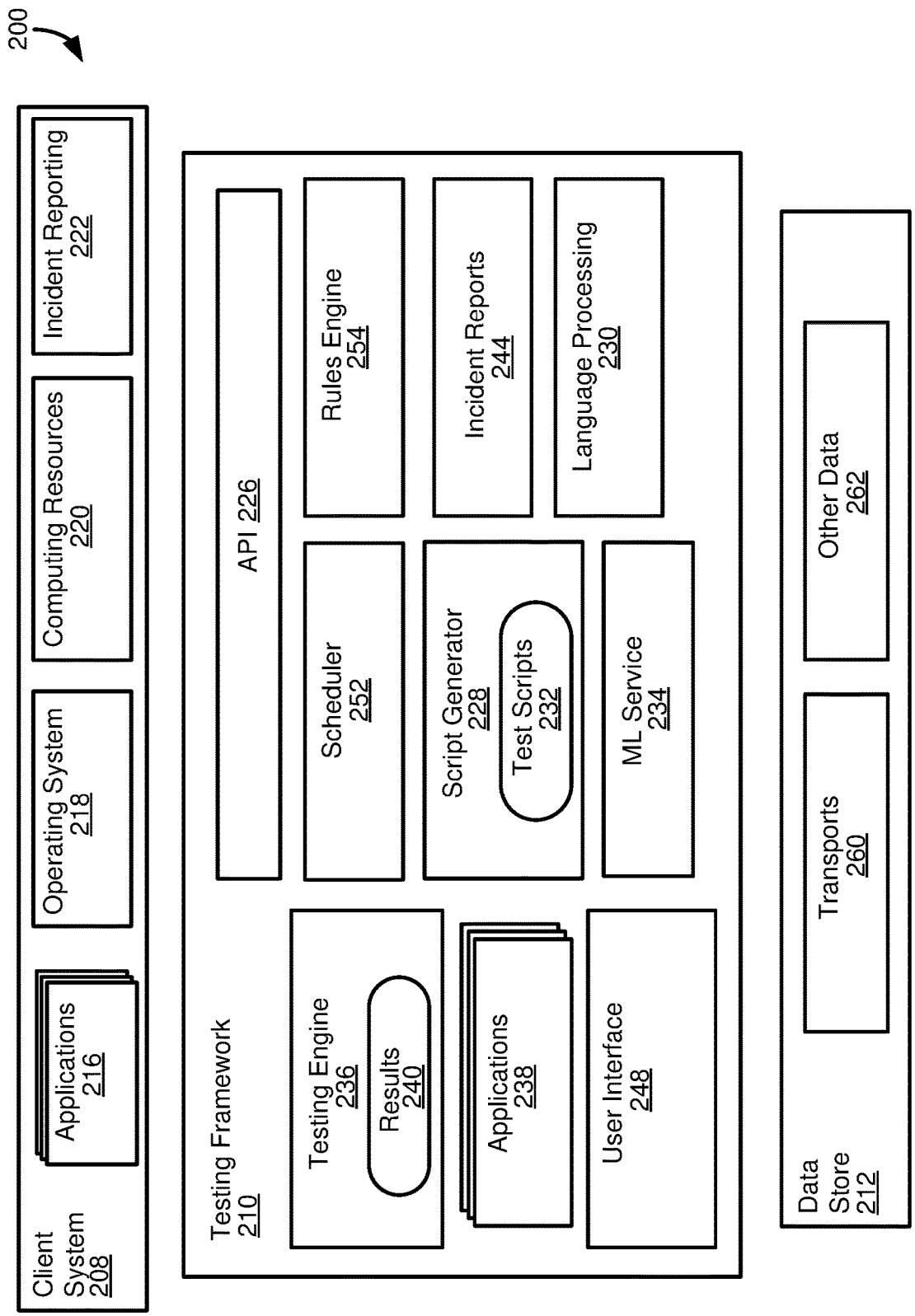
FIG. 2 is a schematic diagram illustrating a computing environment that includes a testing framework and in which disclosed technologies can be implemented.

FIG. 2 illustrates a computing architecture 200 in which disclosed technologies can be implemented, including the process 100 of FIG. 1. The architecture 200 includes a client system 208, a testing framework 210, and a data store 212. It should be appreciated that components of FIG. 2 can be rearranged, including being split or combined. For example, the client system 208 and the testing framework 210 can be part of a common computing system or device, particularly when the client system 208 is used for internal testing, such as during software development.

The client system 208 includes one or more applications 216. At least one of the applications 216 is associated with an incident for which a software update is requested. The application 216 associated with the incident can interact with other software applications. The client system 208 further includes an operating system 218. As explained above, information regarding an operating system 218 can be included in an incident report, which can help in reproducing a software error or in developing a solution for a software error.

The client system 208 further includes computing resources 220. The computing resources 220 can be physical or virtual computing resources, and can include resources such as processors, memory, secondary storage, and network connectivity. As with the applications 216 and the operating system 218, information regarding the computing resources 220 can be useful in reproducing an error or in developing a solution to a software error.

The client system 208 includes an incident reporting tool or application 222. The incident reporting tool or application 222 can be used to send incident information to the testing framework 210. Although shown as a separate component, in some cases the incident reporting tool or application 222 can be a component of an application 216, or can be provided by the testing system 210, such as through a web browser of the client system 208.

The client system 208 can communicate with the testing framework 210. For example, the incident reporting tool or application 222 can call methods of an application program interface (API) 226 provided by the testing framework 210. When an incident report is received by the testing framework 210, such as through the API 226, it can be processed by a script generator 228. In some cases, the script generator 228 can access a language processing component 230 (e.g., a natural language processing component) to extract incident details from an incident report. In other cases, an incident report provided by the client system 208 can be in a structured format, so that the incident report can be converted to an executable format without using the language processing component 230. Or, an incident report can be provided as both structured and unstructured content.

Results from the language processing component, or from structured incident reports, can be stored as a test script 232. In some cases, storing the test script 232 includes generating a test script using a machine learning service 234. For example, the machine learning service 234 can be trained to convert one or more types of incident reports to one or more formats for test scripts 232. That is, in at least some cases, test execution (or automation software) may be designed to test different types of applications, such as having one type of test execution software being used for web browser based programs and having another type of test execution software being used for non-browser based programs.

Once a test script 232 has been generated, it can be executed by a testing engine 236 using one or more applications 238. An application 238 on which a test script 232 is executed is typically the same as the application 216 associated with an incident report. When the application 216 interacted with other applications, such other applications can be included in the applications 238. Although not shown, the testing framework 210 can include other components, such as an operating system that corresponds to the operating system 218, which can help ensure that test results accurately reflect performance on the client system 208.

The testing engine 236 can be a software automation component (e.g., Selenium, eCATT, etc.) or a program that can call such an automation component. The testing engine 236 can generate test results 240.

In some cases, the test results 240 are manually reviewed, such as by a developer or software tester, to determine whether an error has occurred or if, for example, a solution has resolved an error. In other cases, the test results 240 can be reviewed by the machine learning services 234. The machine learning services 234 can be trained, such as using incident reports 244, which can be historical incident reports. In particular, the historical incident reports can represent software errors that were manually reported and manually corrected without using the disclosed technologies. At least a portion of the historical incident reports can be reports that were generated at least in part using disclosed technologies. That is, resolved issues can be used to generate additional training data for the machine learning services 234. These resolved issues can include incident reports that were converted to test scripts 232, but determining whether an error was resolved was performed by a tester or developer, as opposed to being determined automatically.

In further embodiments, a user can train the machine learning services 234 to recognize appropriate (or undesirable) program behavior. For example, if an error occurs on a client computing system, but does not occur on a development system, a machine learning model can be trained to recognize program behavior on the development system as the appropriate behavior.

The test results 240 can be presented to a user, such as a tester or developer, through a user interface 248. If a solution for an incident performs acceptably, it can be implemented, including by deploying the solution to the client system 208. In some cases, the applications 216 used by the client system 208 are not deployed, or at least not entirely deployed, on the client system. For example, an application 216 can be a cloud-based application. In such cases, the solution can be deployed to the appropriate location such that a user of the client system 208 otherwise experiences corrected application behavior.

If the test results 240 indicate that an error was not resolved, the user can adjust the proposed solution, which can then be retested using the previously generated test script 232. Thus, it can be seen that having the test script 232 can expedite and ease software development and correction, in that a user need not manually perform test operations, and in some cases test results can automatically be determined.

A user can use the user interface 248 to perform other operations. For example, the user can access the user interface 248 to edit a test script 232. The user interface 248 can also be used to access a scheduling component 252. The scheduling component 252 can be configured to automatically execute test scripts 232, such as on a time-based schedule (e.g., on a particular date, at particular intervals) or on the occurrence of particular triggering events (e.g., deployment of software updates). Triggering events, and actions to be taken in response thereto, can be carried out in conjunction with a rules engine 254 that can include rules as well as logic for evaluating rule satisfaction.

The scheduling component 252 can be configured to perform other actions. In one implementation, the scheduling component 252 is configured to determine when a solution has been implemented, either on the client system 208 or on a system having applications which are accessed by the client system and which are associated with an incident report. Typically, a tester or developer needs to manually check whether a solution has been deployed on a client system (or system accessible to clients, such as a production system). Such checking can be carried out in order to confirm that an issue has been resolved, and can also be used to allow the tester or developer to confirm that the solution works as expected on the client system 208.

In further scenarios, similar testing for solution deployment can be used, but on a quality/development system rather than a client system 208. That is, even for developers/testers, solutions that are developed may not be immediately deployed and available for automatic or manual testing, and the scheduling component 252 can help ensure that tests are quickly executed when a solution is available for testing.

The scheduling component 252 can also be configured to execute multiple test scripts 232. For example, a batch job can be defined that selects test scripts 232 that are to be retested within a given timeframe. Or, a batch job can be defined that selects test scripts 232 having a given priority level, or satisfying a priority threshold. In some cases, test scripts 232 in batch jobs can be associated with a common software program 216, 238, while in other cases the test scripts can be associated with different software programs. Selecting a batch job by the scheduling component 252 can include determining whether any incidents may be dependent on one another, or whether they relate to a common software program 216, 238, or a component thereof.

The testing framework 210 can communicate with the data store 212. The data store 212 can store transports 260 and other data 262. The transports 260 can be software updates or corrections that are used for deployment purposes, including as used in products available from SAP SE, of Walldorf, Germany Information regarding transports 260 can be used by various aspects of the testing framework 210. The scheduling component 252 can access information about the transports 260 to determine a deployment status of a transport, such as determining whether a transport has been deployed at a particular system, which can trigger the execution of a test script 232. The script generator 228 and the testing engine 236 can access information regarding the transports 260 to setup an execution environment for a test script 232 or in generating the test scripts (for example, determining software version information).

Data of the other data 262 can include data accessed by the applications 216 or the applications 238 (e.g., data stored in a database and provided to an application). The other data 262 can also include data associated with the testing framework 210, including stored test scripts 232 and incident reports, including incident reports 244. For example, incident reports 244 and test scripts 232 may be stored as records in one or more tables of the other data 262.

Example 4—Example User Interface Screen for Querying Incidents

Figure 3:
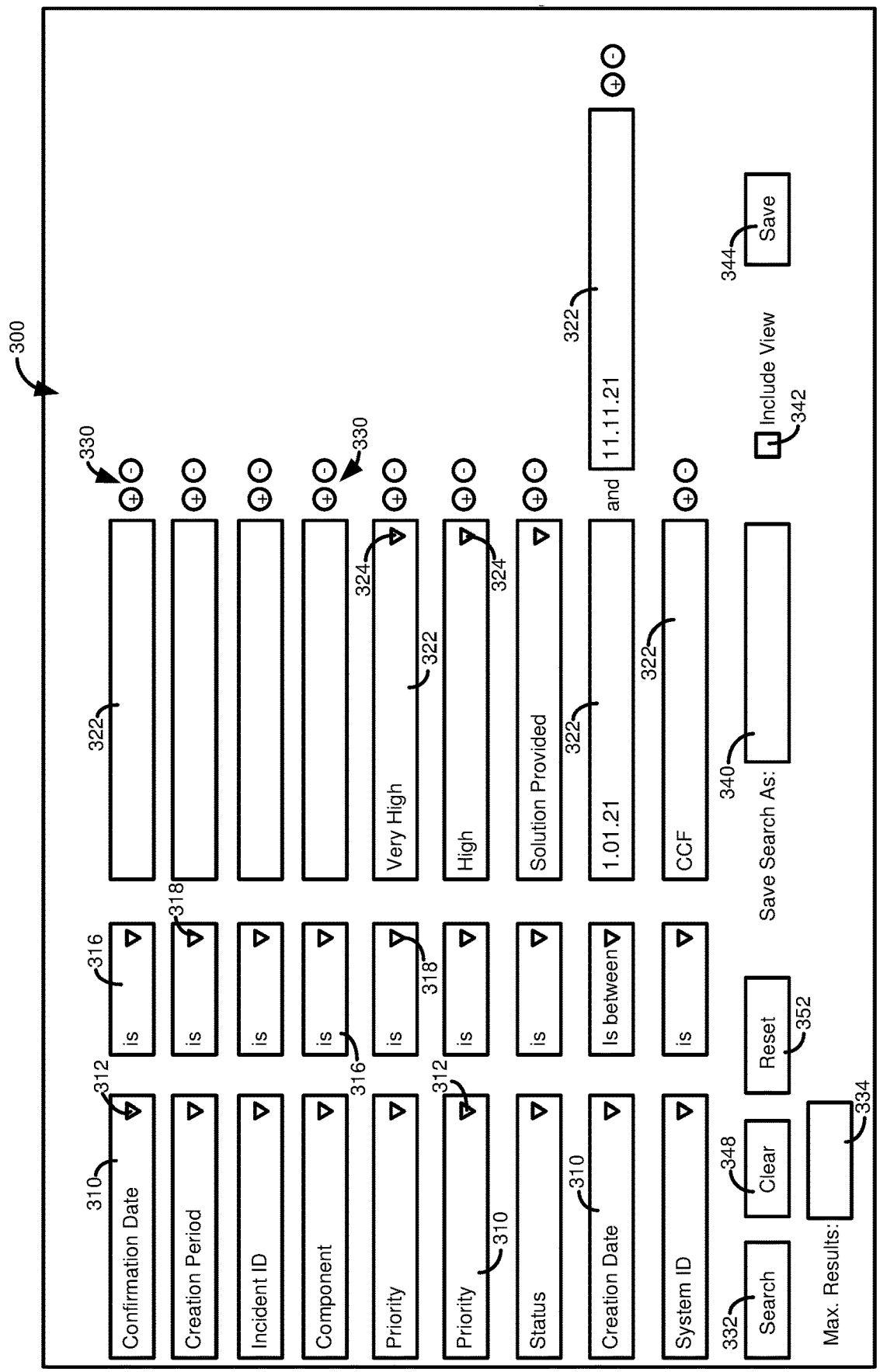
FIG. 3 is an example user interface screen that allows a user to query incident reports.

FIG. 3 illustrates an example user interface screen 300 that can allow a user to search incident reports. The incident reports can be incident reports as received from a user, or can be incident reports that have been processed, such as by the testing framework 210 of FIG. 2. Processing by the testing framework 210 can include natural language processing or transforming received information into a standardized format (or schema).

The user interface screen 300 provides one or more fields 310 in which a user can enter search criteria. As shown, the field type for a given field 310 can be selected from a list of available options using a drop down selector 312. However, other configurations are possible, such as having one or more fields 310 of fixed types.

Field types shown in FIG. 3 for the fields 310 include a confirmation date (such as a date an error was confirmed), a period during which an incident occurred or was reported, an identifier for an incident, a software component which might be associated with an incident, a priority assigned to an incident (e.g., high, medium, low), an incident status (e.g., new, resolved, open, started, in process, awaiting assignment, assigned, reopened), a system identifier (e.g., of a particular client system), or other types of information that may be relevant to an incident report. As described in prior Examples, information in an incident report corresponding to a given field type can be manually provided in some cases, or can be automatically retrieved (e.g., for field types such as system, component, client ID, operating system, etc.).

For a given field 310, the screen 300 can include various logical operations 316 or other type of selection criteria. The logical operations 316 can be changed, at least in some implementations, using a selector 318. Logical operations 316 can include operations such as being equal to a value, being less than a value, being greater than a value, being within a range of values, or containing particular token elements (e.g., wildcard text searches).

Values for the fields 310 can be entered in input fields 322. In some cases, an input field 322 can be associated with predefined options. In such cases, a user can select from among the predefined options using a dropdown selector 324. If additional input fields 322 or logical operations 316 are needed for a given field 310, these elements can be added, or removed, using user interface controls 330.

The values for the fields 310, including the logical operations 316 and values in the input fields 322, can be used to define computer operations to retrieve appropriate results (e.g., test scripts or incident reports meeting the filter conditions), such as when a search is executed in response to a user selecting a search user interface control 332. For example, the logical operations 316 and the values for the input fields 322 can be converted to a query language, such as to a select statement in SQL. If desired, a user can set a maximum number of results in a results limit field 334. In some cases, the user can also select criteria to be used for selecting results within any limit provided in the results limit field 334 (e.g., return oldest incidents, return most recent incidents).

As it can take some time to define a search, and it may be useful to periodically re-execute a search, a user may be allowed to save a search by providing a name for the search in a search name field 340. Optionally, search results can be saved with the actual query by selecting a box 342. The save operation can be executed by selecting a save user interface control 344.

Once search results are provided, a user can clear search results by selecting a user interface control 348. A user can reset the fields 310 (including any logical operations 316 or values in the input fields 322) by selecting a reset user interface control 352.

Example 5—Example User Interface Screen Displaying Incident Information

FIG. 4 illustrates an example user interface screen 400 that provides information regarding incidents. The user interface screen 400 can be presented, for example, after a user executes a query using the user interface screen 300 of FIG. 3.

In some cases, the user can be presented with query text 410. The query text 410 can represent a query to retrieve incident reports meeting particular criteria (which can include a select all query). The query text 410 can also represent actions to add incidents to a database, remove incidents from a database, or to change properties of an incident stored in a database (e.g., to update the status of the incident from open to resolved).

The user interface screen 400 can include information for a number of incidents 420, which can be all incidents or incidents meeting particular criteria. For each incident 420, the information presented can include an identifier 422, which can be an artificially assigned identifier (e.g., for use as a primary key), an incident number 424 (which can, in some cases, be a value that is assigned to new incidents that are reported and then incremented), and a status 426. The status 426 can indicate whether the incident has been resolved, whether it is currently being addressed, whether a deployment is pending, whether any testing has occurred, or similar types of status information.

Information presented for incidents 420 can further include a date that the incident was created 430, which can be a date that the incident occurred or a date that the incident was entered into a tracking system (e.g., the testing framework 210 of FIG. 2). An identifier 432 can indicate a user who reported the incident 420. In some cases, incidents 420 can be automatically reported by a software program. In such cases, the identifier 432 can indicate a program or process from which the incident 420 was received.

A re-testing field 434 can indicate whether retesting has been performed, such as using a testing script 232 of FIG. 2. Retesting can refer to testing to confirm that an error occurs prior to a possible solution being developed/deployed, or whether the error still occurs after a possible solution has been deployed. The retesting field 434 can provide a Boolean value (e.g., true/false, 0/1) in some cases, while in other cases the value can be a number of times retesting has occurred (including zero, or NULL, when retesting has not yet been performed). When the retesting field 434 is provided as a Boolean value, the value can be reset upon the occurrence of particular conditions, manually, or both. For example, the Boolean value can be reset (to false) after a period of time, after a user has viewed a retesting result, or after it has been indicated that a new or updated solution is available for retesting.

A description field 438 provides a description of the incident. Typically, the description provided in the description field 438 includes information sufficient to reproduce the incident (e.g., generate an error or other undesirable program behavior), as well as describing any error that was encountered (and, in some cases, expected behavior). The information in the description field 438 can be information provided by a user (or application) in an incident report, information extracted (and possible formatted) from a user (or application) incident report, or can be a test script (including a test script generated from a user or application incident report, or the results of processing such a report).

A modified date field 442 can provide a date that an incident report 420 was last modified. Modifying an incident report 420 can occur manually, such as by a user editing the status field 426 or the description field 438, or automatically, such as through an automatic update to the status field or to the re-testing field 434.

Incident reports 420 are typically selected by, or assigned to, software testers/developers for investigation and resolution. The name of a developer or tester assigned to an incident report 420 can be provided in a "pickedby" field 446. A retest description field 448 can provide details regarding retesting of an incident. The retest description field 448 can include information such as issues encountered in performing a retest, such as the retest not generating an error, generating a different error than expected, or a proposed solution failing to address an issue or producing new issues. An error category field 452 can describe a type for an error associated with an incident report 420. For example, an error may be a completely new error, or may duplicate a previously-reported error that is unresolved, or which was thought to have been resolved. If an incident report 420 is associated with a retest, a retest result (e.g., pass, fail, fail with new error) can be provided in a retest result field 458.

Certain fields associated with an incident report 420 may not be used, at least at all times, for all incident reports. In such cases, the fields can be left empty, or can be provided with a NULL value or similar value indicating that no value is associated with a given incident report 420.

Using the user interface 400, a user can select incident reports 420 for testing or for scheduling, including selecting multiple incident reports for a testing job. Alternatively, a job can be defined using search criteria and matching incident reports 420 can be selected for execution or scheduling.

Figure 5:
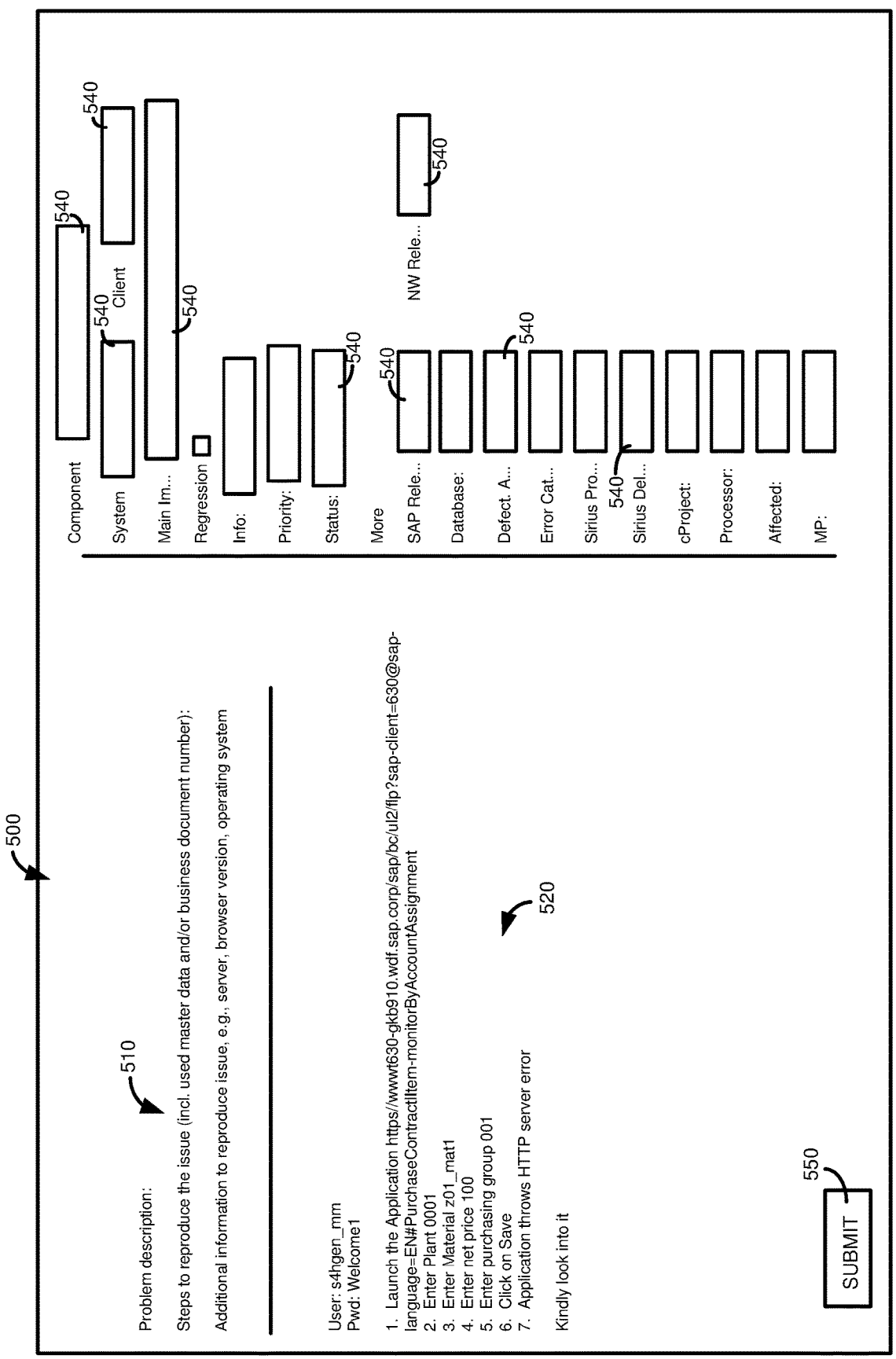
FIG. 5 is an example user interface screen for entering an incident report.

Example 6—Example User Interface Screen for Entering Incident Report and Example Incident Report FIG. 5 illustrates an example user interface screen 500 through which a user can generate an incident report. The incident report can be sent to a testing framework, such as the testing framework 210 of FIG. 2.

The user interface screen 500 can provide instructions 510 regarding information needed for an incident report. The information can include the application in which the error was encountered, its version, a particular user interface screen or process that was being used, and actions taken prior to encountering the error. The information can further include a description of the error (e.g., program crashed, file failed to save) and optionally an expected behavior (e.g., a program should have proceeded to a user interface screen for a next action).

As shown, the user interface screen 500 includes a text entry area 520 where a user can enter information requested by the instructions 510. As has been described, text provided in the text entry area 520 can be processed using natural language processing techniques to extract and format (e.g., according to a schema) the text such that it can be used to generate a test script and information useable to enter the incident into a tracking/reporting system.

Although the text entry area 520 allows for free form text entry by a user, in other cases an incident can be input in another manner. For example, an input form may have fields associated with particular types of information (e.g., software application identifier, fields where a user can input sequential actions), which can allow incident reports to be generated without natural language processing, or to increase the accuracy of results provided by natural language processing.

FIG. 5 illustrates some uses of input fields, in the form of input fields 540. Input fields 540 allow a user to provide input in a structured manner In at least some cases, at least some of the fields 540 can be pre-populated with information. In some cases, a user can be allowed to edit any information that was pre-populated into the fields 540. As shown, the input fields 540 provide values for a software component associated with an error, a system associated with the error, a client identifier, an indicator of a main impact of the error (e.g., core functionality, user interface controls, I/O operations), a priority of the error, or a status of the error (e.g., new, recurrence). Additional fields 540 can allow a user to enter values that associate the incident with other collaboration or error resolution tools.

Once relevant information has been entered in the text entry area 520 and the fields 540, a user can submit the incident for processing using a submit user interface control 550.

FIG. 6 provides an example of an incident report 600 that can be generated using the user interface screen 500. Note that the incident report 600 can represent an unprocessed user incident report. An entry in a testing framework, and a test script, can be generated by processing the incident report 600, including using natural language processing for text 610 of the incident report and extracting information from structured fields 620.

Example 7—Example Re-Testing Scenario

Figure 7A:
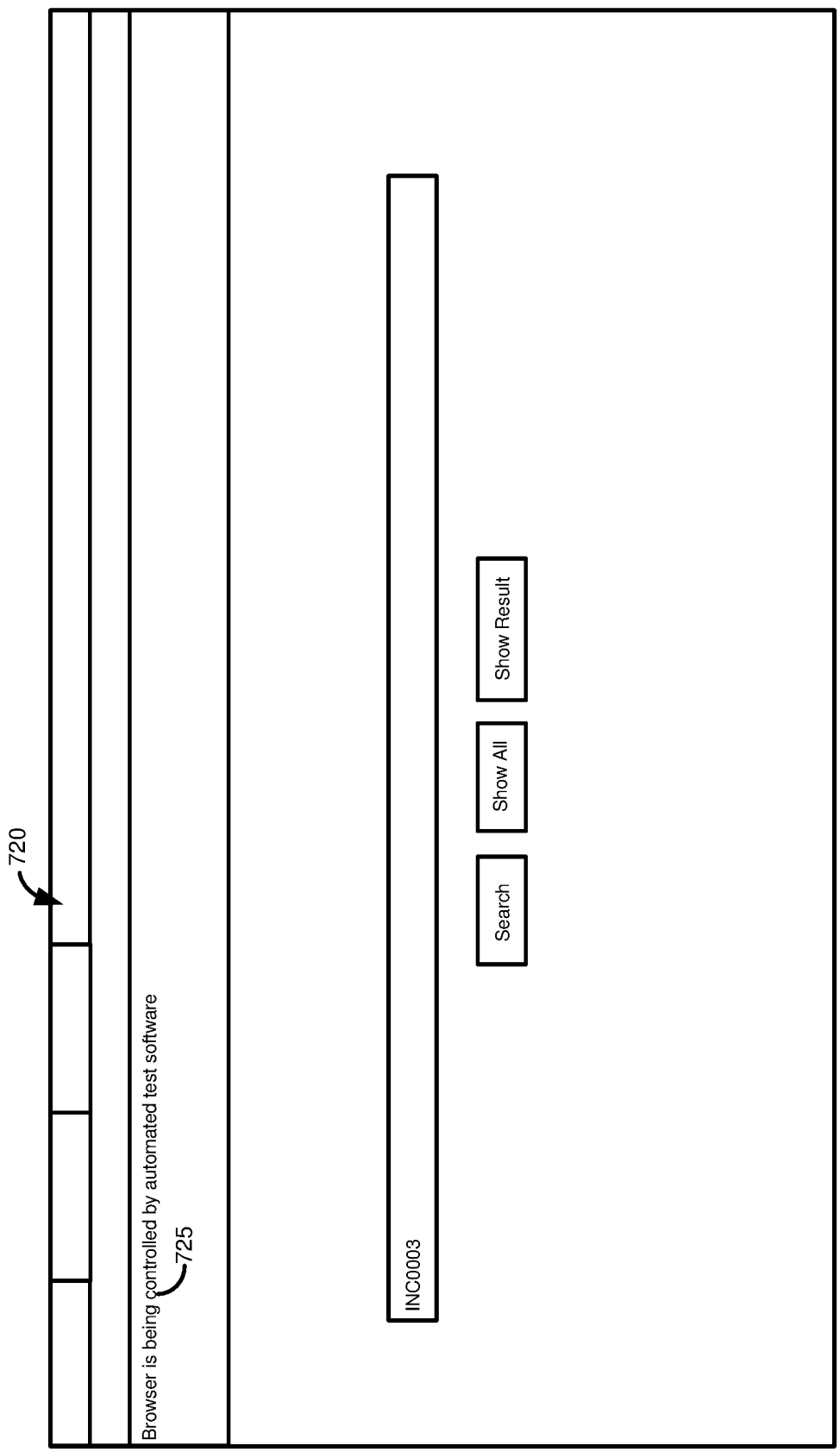
Figure 7B:
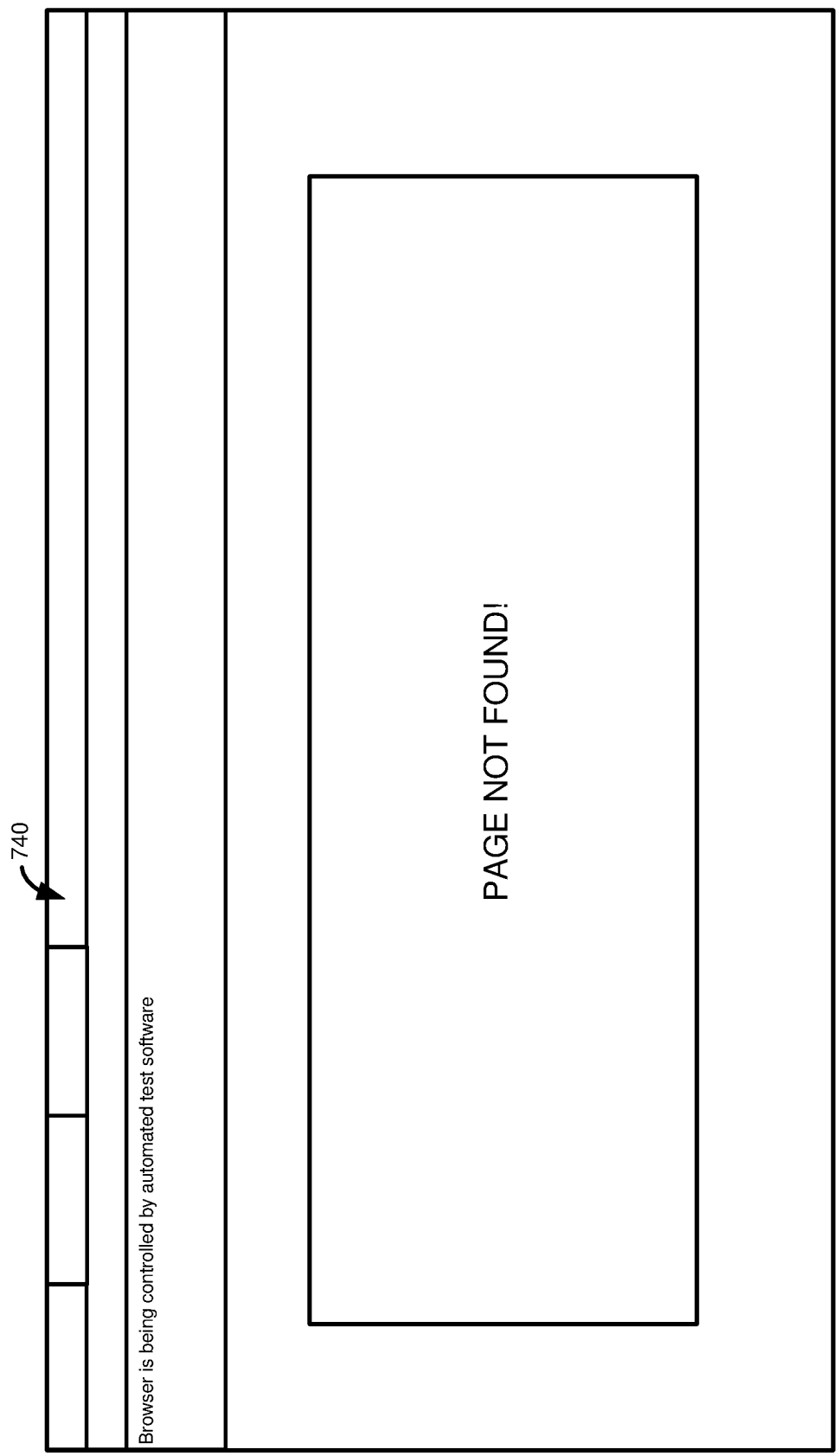

FIGS. 7A-7C provide user interface screens 720, 740, 760 illustrating various stages of testing using disclosed technologies. Referring first to FIG. 7A, when a test is to be executed, the appropriate test script can be retrieved and executed. In some cases, a test script can be directly executed on an application, while in other cases execution is carried out by automation software, such as Selenium or eCATT.

As shown in FIG. 7A, the user interface screen 720 represents a web browser. A notification 725 can be provided that the browser is being controlled by automation software. In the scenario of FIGS. 7A-7C, the intended software functionality is to allow a user to select a particular incident to view, or to show all incidents. Thus, a test script can include operations to launch an application, activate a text entry field, enter text, and activate a search button. However, rather than an expected result of returning details for one or more incidents reports, input actions with user interface screen 700 results in an error, such as a http page not found error, as shown in the screen 740 of FIG. 7B. In some cases, a machine learning model can be used to recognized that the screen 740 indicates that an error is present/has not been resolved, such as by training the model with known erroneous behavior.

After the error is encountered, a record for the incident can be updated. For example, the record can be updated to reflect that retesting has been performed and that the error was not resolved.

At a later time, such as after a potential solution has been developed and deployed, the test can be executed again, as in FIG. 7A. For this test, the result shown in the screen 760 of FIG. 7C is obtained. In this case, the expected behavior occurs, where incidents 765 are displayed. In some cases, the incidents 765 can be separate incidents that address a common error condition (e.g., multiple clients report the same, or a similar, error, and so corresponding incidents can be grouped together).

After the screen 760 is displayed, a record for the incident can be updated. For example, the record can be updated to reflect that retesting has been performed and an error was not encountered (and therefore the incident can be marked as resolved). In some cases, machine learning can be used to recognize the screen 760 as an indication that a problem has been resolved, such as by training the model with expected behavior.

Example 8—Example Implementation

FIGS. 8A-8D provide example Python source code that provides an example implementation of disclosed technologies. FIG. 8A is code for a main file, App.py, that creates a testing job (e.g., that determines whether test scripts should be executed, and causes them to be executed) that runs on a scheduled basis.

FIG. 8B is code for a file that provides a connection to a database. When the scheduler is to connect to the database, such as to retrieve incident reports/test scripts that match query conditions, the code of FIG. 8B can be executed. For example, the scheduler can execute the code of FIG. 8B to identify incidents where a solution has been provided/the incident is closed or incidents identified as "NewDefect" which can refer to incidents which are open, and are ready for retesting.

FIGS. 8C and 8D present code for a controller, such as for implementing testing jobs initiated using the code of FIG. 8A. The code analyzes a set of incidents to determine which incidents may be retested. Test scripts can be executed for any such identified incidents.

FIG. 8E is code for natural language processing of an incident. In this example, the code dynamically generates test steps from a test description. In some cases, this generation is performed the first time an incident is retested. The test script generated by natural language processing can be saved and used for future retesting of the incident. The code of FIG. 8D also calls automation software, in this case Selenium, to execute the test script generated through natural language processing. After testing, the code of FIG. 8D saves test results to the database record for the incident, and provides a notification to one or more users (e.g., a user who reported the error or a user responsible for addressing the error).

Example 9—Example Test Generation and Execution Operations

FIG. 9A is a flowchart of an example method 900 of automatically generating a test script for an incident report associated with undesirable program behavior and determining whether the undesirable program behavior has been resolved. The method 900 can be performed, in some examples, using the computing environment 200 of FIG. 2.

An incident report is received at 904. The incident report includes one or more actions that resulted in unexpected behavior of a computer program. At 908, a test script is automatically generated from the incident report. The test script is executed at 912 to provide execution results. It is determined at 916 whether the test execution results indicate resolution of the unexpected behavior. At 920, a user interface display is rendered that includes at least a portion of the test execution results.

FIG. 9B is a flowchart of another example method 930 of automatically generating a test script for an incident report associated with undesirable program behavior and determining whether the undesirable program behavior has been resolved. The method 930 can be performed, in some examples, using the computing environment 200 of FIG. 2.

An incident report is received at 934. The incident report includes one or more actions that resulted in undesirable behavior of a computer program. At 938, the incident report is processed using natural language processing techniques to generate a plurality of execution steps carried out in generating the undesirable behavior. A test script is automatically generated from the plurality of execution steps at 942. The test script is executed at 946 to provide execution results. It is determined at 950 whether the test execution results indicate resolution of the undesirable behavior. At 954, a user interface display is rendered that includes at least a portion of the test execution results.

FIG. 9C is a flowchart of a further example method 960 of automatically generating a test script for an incident report associated with undesirable program behavior and determining whether the undesirable program behavior has been resolved. The method 960 can be performed, in some examples, using the computing environment 200 of FIG. 2.

An incident report is received at 964. The incident report includes one or more actions that resulted in undesirable behavior of a computer program. At 968, the incident report is processed using natural language processing techniques to generate a plurality of execution steps carried out in generating the undesirable behavior. A test script is automatically generated from the plurality of execution steps at 972. The test script is executed at 976 to provide execution results.

At 980, a machine learning model is trained to recognize undesirable program behavior. The test execution results are provided to the machine learning model at 984 to provide a machine learning result. At 988, the machine learning result is used to determine whether the test execution results resolved the undesirable behavior. At 992, a user interface display is rendered that includes at least a portion of the test execution results.

Example 10—Computing Systems

Figure 10:
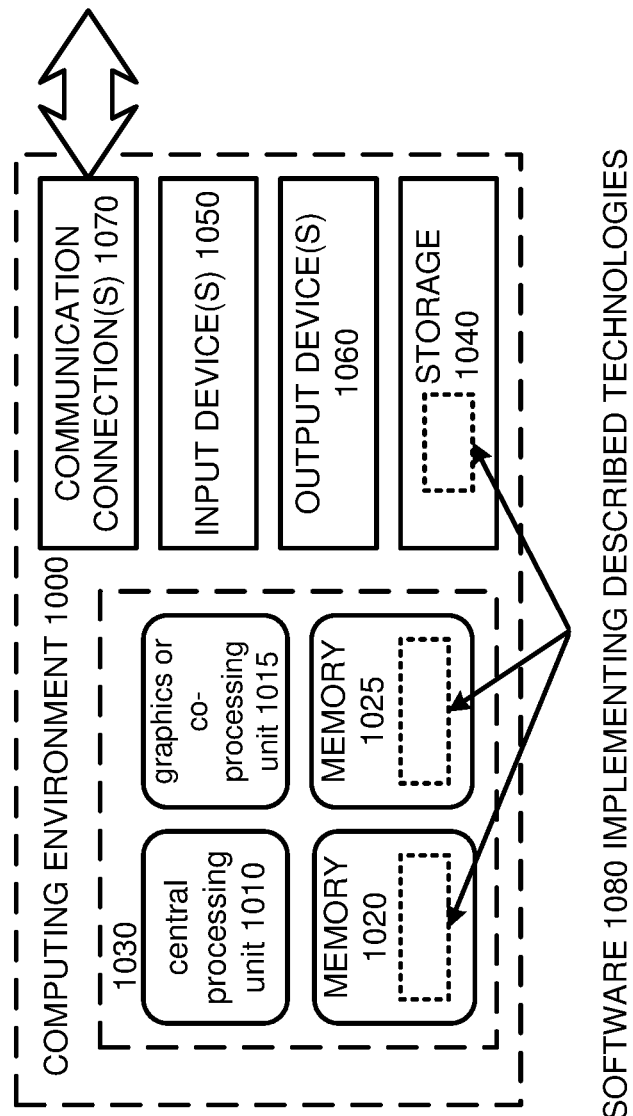
FIG. 10 is a diagram of an example computing system in which some described embodiments can be implemented.

FIG. 10 depicts a generalized example of a suitable computing system 1000 in which the described innovations may be implemented. The computing system 1000 is not intended to suggest any limitation as to scope of use or functionality of the present disclosure, as the innovations may be implemented in diverse general-purpose or special-purpose computing systems.

With reference to FIG. 10, the computing system 1000 includes one or more processing units 1010, 1015 and memory 1020, 1025. In FIG. 10, this basic configuration 1030 is included within a dashed line. The processing units 1010, 1015 execute computer-executable instructions, such as for implementing components of the architecture 200 of FIG. 2, including as further described in Examples 1-9. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 10 shows a central processing unit 1010 as well as a graphics processing unit or co-processing unit 1015. The tangible memory 1020, 1025 may be volatile memory (e.g., registers, cache, RAM), non-volatile memory (e.g., ROM, EEPROM, flash memory, etc.), or some combination of the two, accessible by the processing unit(s) 1010, 1015. The memory 1020, 1025 stores software 1080 implementing one or more innovations described herein, in the form of computer-executable instructions suitable for execution by the processing unit(s) 1010, 1015.

A computing system 1000 may have additional features. For example, the computing system 1000 includes storage 1040, one or more input devices 1050, one or more output devices 1060, and one or more communication connections 1070. An interconnection mechanism (not shown) such as a bus, controller, or network interconnects the components of the computing system 1000. Typically, operating system software (not shown) provides an operating environment for other software executing in the computing system 1000, and coordinates activities of the components of the computing system 1000.

The tangible storage 1040 may be removable or non-removable, and includes magnetic disks, magnetic tapes or cassettes, CD-ROMs, DVDs, or any other medium which can be used to store information in a non-transitory way and which can be accessed within the computing system 1000. The storage 1040 stores instructions for the software 1080 implementing one or more innovations described herein.

The input device(s) 1050 may be a touch input device such as a keyboard, mouse, pen, or trackball, a voice input device, a scanning device, or another device that provides input to the computing system 1000. The output device(s) 1060 may be a display, printer, speaker, CD-writer, or another device that provides output from the computing system 1000.

The communication connection(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general purpose program, such as one or more lines of code in a larger or general purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 11—Cloud Computing Environment

Figure 11:
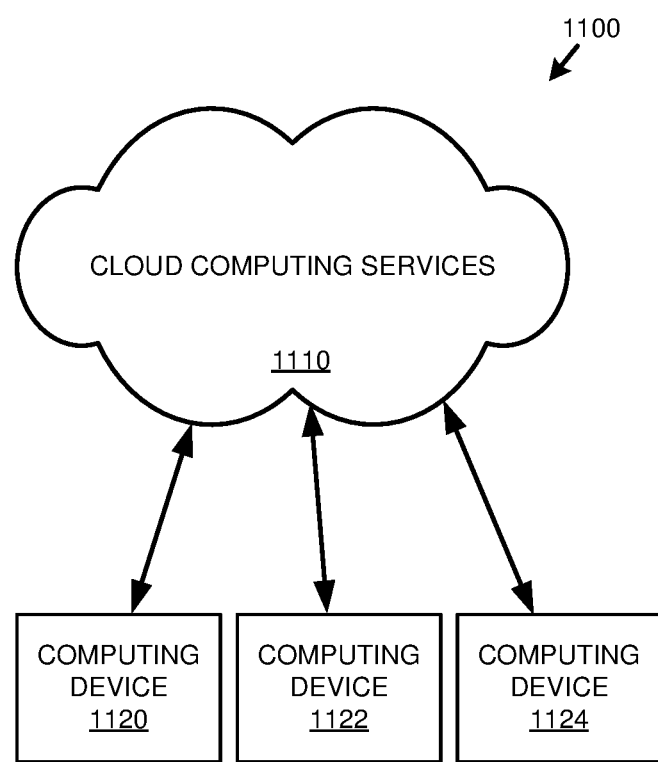
FIG. 11 is an example cloud computing environment that can be used in conjunction with the technologies described herein.

FIG. 11 depicts an example cloud computing environment 1100 in which the described technologies can be implemented. The cloud computing environment 1100 comprises cloud computing services 1110. The cloud computing services 1110 can comprise various types of cloud computing resources, such as computer servers, data storage repositories, networking resources, etc. The cloud computing services 1110 can be centrally located (e.g., provided by a data center of a business or organization) or distributed (e.g., provided by various computing resources located at different locations, such as different data centers and/or located in different cities or countries).

The cloud computing services 1110 are utilized by various types of computing devices (e.g., client computing devices), such as computing devices 1120, 1122, and 1124. For example, the computing devices (e.g., 1120, 1122, and 1124) can be computers (e.g., desktop or laptop computers), mobile devices (e.g., tablet computers or smart phones), or other types of computing devices. For example, the computing devices (e.g., 1120, 1122, and 1124) can utilize the cloud computing services 1110 to perform computing operators (e.g., data processing, data storage, and the like).

Example 12—Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 10, computer-readable storage media include memory 1020 and 1025, and storage 1040. The term computer-readable storage media does not include signals and carrier waves. In addition, the term computer-readable storage media does not include communication connections (e.g., 1070).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

It should be understood that the disclosed technology is not limited to any specific computer language or program. For instance, the disclosed technology can be implemented by software written in C, C++, C#, Java, Perl, JavaScript, Python, Ruby, ABAP, SQL, XCode, GO, Adobe Flash, or any other suitable programming language, or, in some examples, markup languages such as html or XML, or combinations of suitable programming languages and markup languages. Likewise, the disclosed technology is not limited to any particular computer or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
   memory;
   one or more processing units coupled to the memory; and
   one or more computer readable storage media storing instructions that, when executed by the computing system, cause the computing system to perform operations comprising:

receiving an incident report, the incident report comprising one or more actions that resulted in unexpected behavior of a software application;

automatically generating a test script from the incident report;

executing the test script to provide test execution results, the executing the test script comprising deploying a program modification for the software application;

determining that the test execution results indicate resolution of the unexpected behavior; and automatically deploying the program modification applied during execution of the test script.

2. The computing system of claim 1, the operations further comprising:

monitoring a system to which the program modification was automatically deployed to determine when the program modification is active on the system;

determining that the program modification is active on the system; and in response to determining that the program modification is active on the system, updating a record for the incident report to indicate that the program modification is active on the system.

3. The computing system of claim 1, the operations further comprising:

in response to determining that the program modification is active on the system, executing the test script on the system.

4. The computing system of claim 1, the operations further comprising:

processing the incident report using natural language processing techniques to generate a plurality of execution steps carried out in generating the unexpected behavior;

wherein generating a test script comprises generating the test script using the plurality of execution steps.

5. The computing system of claim 4, wherein the incident report comprises information useable to generate the plurality of execution steps as unstructured text.

6. The computing system of claim 1, the operations further comprising:

training a machine learning model to recognize unexpected program behavior; and providing the test execution results to the machine learning model to provide a machine learning result;

wherein determining whether the test execution results resolved the unexpected behavior is carried out using the machine learning result.

7. The computing system of claim 1, the operations further comprising:

receiving user input through a graphical user interface indicating whether the unexpected behavior was resolved and the determining whether the test execution results resolved the unexpected behavior is carried out using the user input.

8. The computing system of claim 1, wherein executing the test script is carried out by automation software on the software application.

9. The computing system of claim 1, the operations further comprising:

determining that the software application has been modified; and in response to determining that the software application has been modified, re-executing the test script.

10. The computing system of claim 1, wherein the incident report is a first incident report for a first incident, the test script is a first test script, and the operations further comprising:

defining a re-testing job comprising the first test script and at least a second test script for at least a second incident report for at least a second incident.

11. The computing system of claim 10, wherein the first test script and the at least a second test script are executed within a defined timeframe.

12. The computing system of claim 10, wherein the first test script and the at least a second test script are selected for the re-testing job based on priorities defined for the first incident report and the at least a second incident report.

13. The computing system of claim 12, wherein the first test script and the at least a second test script are selected from a set of test scripts comprising a plurality of additional test scripts.

14. The computing system of claim 1, the operations further comprising:

persistently storing the test script, wherein the executing the test script is a first execution of the test script and a second execution of the test script comprises retrieving the persistently stored test script.

15. A computer-implemented method comprising:

training a machine learning model to recognize undesirable program behavior;

receiving an incident report, the incident report comprising one or more actions that resulted in undesirable behavior of a software application;

processing the incident report using natural language processing techniques to generate a plurality of execution steps carried out in generating the undesirable behavior;

automatically generating a test script from the plurality of execution steps;

executing the test script to provide test execution results;

providing the test execution results to the machine learning model to provide a machine learning result;

determining whether the test execution results indicate resolution of the undesirable behavior using the machine learning result; and rendering a user interface display comprising at least a portion of the test execution results.

16. The computer implemented method of claim 15, further comprising:

deploying a program modification to a computing system on which the undesirable behavior of the software program occurred;

monitoring the computing system to which the program modification was automatically deployed to determine when the program modification is active on the computing system;

determining that the program modification is active on the system; and in response to determining that the program modification is active on the computing system, updating a record for the incident report to indicate that the program modification is active on the computing system.

17. One or more non-transitory computer readable storage media comprising:

computer-executable instructions that, when executed by a computing system comprising at least one hardware processor and at least one memory coupled to the at least one hardware processor, cause the computing system to receive an incident report, the incident report comprising one or more actions that resulted in undesirable behavior of a software application;

computer-executable instructions that, when executed by the computing system, cause the computing system to process the incident report using natural language processing techniques to generate a plurality of execution steps carried out in generating the undesirable behavior;

computer-executable instructions that, when executed by the computing system, cause the computing system to automatically generate a test script from the plurality of execution steps;

computer-executable instructions that, when executed by the computing system, cause the computing system to execute the test script to provide test execution results, wherein the test script is executed on the software application by automation software;

computer-executable instructions that, when executed by the computing system, cause the computing system to train a machine learning model to recognize undesirable program behavior;

computer-executable instructions that, when executed by the computing system, cause the computing system to provide the test execution results to the machine learning model to provide a machine learning result;

computer-executable instructions that, when executed by the computing system, cause the computing system to use the machine learning result to determine whether the test execution results resolved the undesirable behavior; and computer-executable instructions that, when executed by the computing system, cause the computing system to render a user interface display comprising at least a portion of the test execution results.

18. The one or more non-transitory computer-readable storage media of claim 17, the operations further comprising:

computer-executable instructions that, when executed by the computing system, cause the computing system to deploy a program modification to a computing system on which the undesirable behavior of the software program occurred;

computer-executable instructions that, when executed by the computing system, cause the computing system to monitor the computing system to which the program modification was automatically deployed to determine when the program modification is active on the computing system;

computer-executable instructions that, when executed by the computing system, cause the computing system to determine that the program modification is active on the computing system; and computer-executable instructions that, when executed by the computing system, cause the computing system to, in response to determining that the program modification is active on the computing system, update a record for the incident report to indicate that the program modification is active on the computing system.

19. A computing system comprising:

memory;

one or more processing units coupled to the memory; and one or more computer readable storage media storing instructions that, when executed by the computing system, cause the computing system to perform operations comprising:

receiving a first incident report for a first incident, the first incident report comprising one or more actions that resulted in unexpected behavior of a software application;

automatically generating a first test script from the first incident report;

executing the first test script to provide test execution results;

determining that the test execution results indicate resolution of the unexpected behavior;

rendering a user interface display comprising at least a portion of the test execution results;

defining a re-testing job comprising the first test script and at least a second test script for at least a second incident report for at least a second incident.

20. The computing system of claim 19, the operations further comprising:

processing the first incident report using natural language processing techniques to generate a plurality of execution steps carried out in generating the unexpected behavior;

wherein generating a test script comprises generating the test script using the plurality of execution steps.

* * * * *